United States Patent [19]

Ozimek et al.

[11] Patent Number: 5,149,935
[45] Date of Patent: Sep. 22, 1992

[54] METHOD AND APPARATUS FOR FORMING AMALGAM PREFORM

[75] Inventors: Edward J. Ozimek, Penfield; Edward Carnall, Jr.; David N. Bull, both of Rochester, all of N.Y.

[73] Assignee: Eastman Kodak Company, Rochester, N.Y.

[21] Appl. No.: 594,806

[22] Filed: Oct. 9, 1990

[51] Int. Cl.⁵ .............................................. B23K 26/00
[52] U.S. Cl. ........................... 219/121.65; 219/121.66; 427/53.1
[58] Field of Search ............... 427/45.1, 49, 53.1, 427/374.5, 271, 380, 383.1; 219/121.63, 121.64, 121.65, 121.66; 420/526

[56] References Cited

U.S. PATENT DOCUMENTS

| | | | |
|---|---|---|---|
| 3,410,979 | 11/1968 | Larsson | 219/68 |
| 3,587,377 | 6/1971 | Olson et al. | 83/171 |
| 4,007,349 | 2/1977 | Burley | 219/10.43 |
| 4,435,611 | 3/1984 | Ohsawa et al. | 174/68.5 |
| 4,594,499 | 6/1986 | Rapsey et al. | 219/221 |
| 4,684,781 | 8/1987 | Frish et al. | 427/53.1 |
| 5,007,686 | 4/1991 | Klein et al. | 219/121.66 |
| 5,043,139 | 8/1991 | Carnall, Jr. et al. | 420/526 |

FOREIGN PATENT DOCUMENTS 61-68178 4/1986 Japan ................................ 427/383.1

OTHER PUBLICATIONS

Abstract-C. A. MacKay, International Electronic Packaging Conf., San Diego, Calif., Sep., 11-13, 1989, published in the Conference Proceedings, pp. 1244-1259, Int. Electronic Packaging Society, Sep. 1989.

*Primary Examiner*—Geoffrey S. Evans
*Attorney, Agent, or Firm*—Stephen C. Kaufman

[57] ABSTRACT

A method and apparatus for forming a solid preform body of an amalgam from a thin layer of the amalgam comprises a base plate on which the amalgam in liquid form is spread into a thin layer. The amalgam comprises a mixture of a liquid metal and a powdered metal. A first temperature is applied to the amalgam layer through the base plate. The first temperature may be lower than the melting temperature of the liquid metal in the amalgam to form a frozen solid layer of the amalgam, or may be above the melting temperature of the liquid metal to maintain the amalgam layer in liquid form. A second temperature is applied to a portion of the amalgam layer which is to form the preform body. If the first temperature is below the melting temperature of the liquid metal, the second temperature is above the melting temperature of the liquid metal to form a molten zone in the amalgam layer along the edge of the preform body so as to permit the body to be separated from the remaining portion of the amalgam layer. If the first temperature is above the melting temperature of the liquid metal, the second temperature is below the melting temperature so as to form a frozen solid portion in the amalgam layer which can be removed from the amalgam layer.

16 Claims, 2 Drawing Sheets

METHOD AND APPARATUS FOR FORMING AMALGAM PREFORM

FIELD OF THE INVENTION

The present invention relates to methods and apparatus for forming preform bodies of an amalgam, and, more particularly, to methods and apparatus for forming preform bodies from a thin sheet of an amalgam.

BACKGROUND OF THE INVENTION

An amalgam is a mixture of a liquid metal, such as mercury or gallium, and one or more powdered metals, such as nickel, copper, silver, gold, antimony, tin, cobalt, magnesium, manganese, chromium, titanium, molybdenum, aluminum, iron, etc. Amalgams can be formed at or near room temperature, but when cured and hardened, have melting temperatures well above room temperature. It has been suggested that amalgams be used as a bonding material for bonding together the parts of a solid state device. For example, for bonding the cover plate to a housing of a solid state device package as described in the copending application of E. Carnall, Jr. et al (Ser. No. 594,789), filed concurrently herewith and entitled "Hermetically Sealed Microelectronic Package and Method of Making the Same", or for bonding a solid state device to a terminal board as described in the copending application of D. Bull et al (Ser. No. 594,786), filed concurrently herewith and entitled "Bonding of Solid State Device to Terminal Board". The use of an amalgam as a bonding material in solid state devices is particularly useful where the device cannot withstand the high temperature required for most solders which are generally used. Amalgams may be processed at temperatures below the maximum allowable processing temperature for the device but, after curing, have melting temperatures which far exceed the maximum processing temperature. In order to facilitate the use of an amalgam as a bonding material, it would be desirable to have the amalgam in the form of a solid preform of a shape and size to correspond with the parts to be bonded together. It has been suggested to form the amalgam into a preform using a mold as described in the copending application of E. Carnall Jr. et al (Ser. No. 594,793) filed concurrently herewith and entitled "Amalgam Preform, Method of Forming the Preform and Method of Bonding Therewith". It has also been suggested to form the amalgam into a solid thin sheet from which the preforms can be formed. As described in the copending application of E. J. Ozimek (Ser. No. 594,892), filed concurrently herewith and entitled "Method of Forming Thin Sheet of an Amalgam", the solid thin sheet of the amalgam is formed by spreading the liquid amalgam over a surface as a thin layer, and then lowering the temperature of the layer to below the melting temperature of the liquid metal in the amalgam to freeze the layer into a solid sheet. The solid sheet can then be cut or otherwise formed into the preforms. However, we have found that cutting the frozen amalgam sheet to the desired dimensions is not easy to do. The material does not shear easily even though it is of a thickness of one or two mils (0.001 to 0.002 inches). Therefore, it would be desirable to have a method and apparatus for easily separating the amalgam sheet into desired shapes and sizes.

SUMMARY OF THE INVENTION

An amalgam preform is formed by forming a layer of an amalgam, which is a mixture of a liquid metal and at least one powdered metal. The layer may be formed on a surface, such as a base plate. The entire layer of the amalgam is maintained at a first temperature, such as by controlling the temperature of the base plate. A second temperature is applied along a portion of the amalgam layer which defines the preform, such as with an electrode or die. One of the temperatures is below the melting temperature of the liquid metal of the amalgam and the other temperature is above the melting temperature of the liquid metal so as to separate the preform portion of the layer from the rest of the layer. For example, the first temperature may be below the melting point of the liquid metal to maintain the layer frozen, while the second temperature is above the melting point of the liquid metal so as to melt the edge of the preform portion and allow the preform portion to be removed from the remaining portion of the layer. Alternatively, the first temperature may be above the melting point of the layer to maintain it in liquid form, while the second temperature is below the melting temperature of the liquid metal so as to freeze the preform portion and allow it to be removed from the remaining liquid portion of the layer.

The method of the present invention for forming a body of an amalgam of a desired shape and size comprises forming the amalgam, which is a mixture of a liquid metal and a powdered metal, into a thin layer. A first temperature is applied to the entire layer of the amalgam and a second temperature is applied to a portion of the amalgam layer which is to form the body of the desired shape and size. One of the temperatures is below the melting temperature of the liquid metal of the amalgam and the other temperature is above the melting temperature of the liquid metal of the amalgam. The apparatus of the present invention for forming from a thin layer of an amalgam a body of a desired shape and size comprises means for applying the first temperature to the layer and means for applying the second temperature to the layer along the edges of the portion of the layer which is to form the body.

The invention will be better understood from the following more detailed description taken with the accompanying drawings.

DETAILED DESCRIPTION

In general, the method of the present invention for forming a preform body of an amalgam comprises first forming an amalgam in liquid form. An amalgam comprises a mixture of a liquid metal, such as mercury or gallium, and a powdered metal, such as nickel, copper, silver, gold, antimony, tin, cobalt, magnesium, manganese, chromium, titanium, molybdenum, aluminum, iron or mixtures thereof. In general, the liquid metal is present in the mixture in the amount of 55% to 95% by weight. When the amalgam is to be used in a solid state device, gallium is preferred as the liquid metal because mercury is toxic and can adversely affect the electrical characteristics of certain types of solid state devices. Copper and nickel are preferred as the powdered metal because they form amalgams having desirable properties, are relatively inexpensive and are readily available. In amalgams containing gallium as the liquid metal and powdered copper and/or nickel, the gallium is preferably present in the amount of 65% to 70% by weight. The ingredients of the amalgam may be mixed together manually using a container and a stainless steel pestle with a hammering action. However, it can also be achieved using a commercially available amalgamator, which is a device having a vibratory arm which holds a capsule containing the mixture along with a pestle to provide the hammering action. In an amalgamator, the ingredients can be mixed together in a matter of seconds, 15 seconds or more. When the ingredients are mixed together, the amalgam is in a liquid state and can be very fluid.

The liquid amalgam is then poured onto a surface and spread out into a thin layer. This can be accomplished with either a roller or a doctor blade which is passed over the amalgam, or by rotating the surface to spread the amalgam out by centrifugal force. A first temperature is applied to the surface so that the first temperature is applied over the entire layer of the amalgam. As will be explained later, this first temperature may be above or below the melting temperature of the liquid metal in the amalgam. Means is provided over the amalgam layer for applying a second temperature to the portion of the amalgam layer which forms the outer edge of the preform being formed. If the first temperature is below the melting temperature of the liquid metal in the amalgam, the second temperature is above the melting temperature. Alternatively, if the first temperature is below the melting temperature of the liquid metal, the second temperature is above the melting temperature. The application of the second temperature defines the preform and separates it from the remaining portion of the amalgam layer. The preform can then be removed from the surface.

Figure 1:
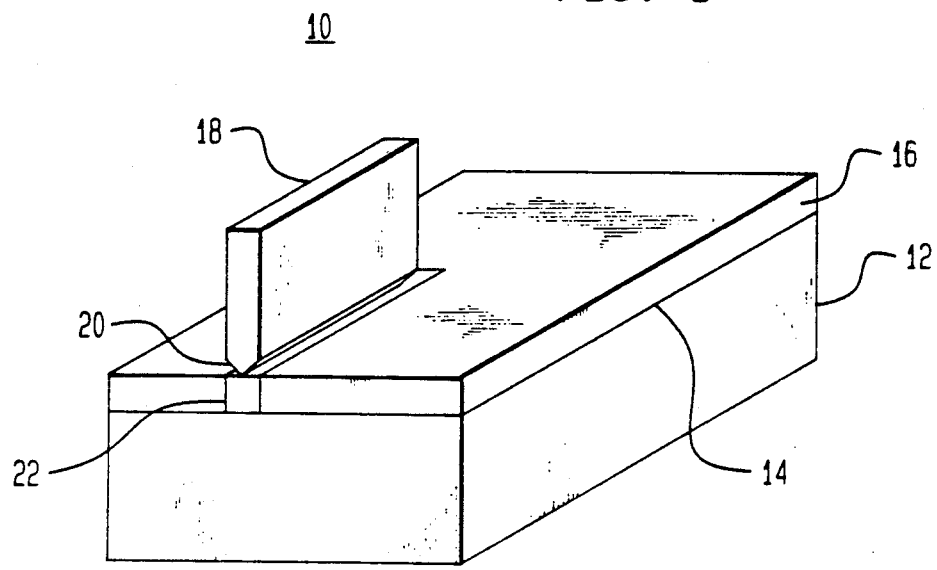
FIG. 1 is a perspective view of an apparatus for carrying out the method of the present invention.

Referring to FIG. 1, there is shown a perspective view of an apparatus 10 for carrying out the method of the present invention. Apparatus 10 comprises a base plate 12 of a good heat conducting material, such as copper or aluminum, having a surface 14. The liquid amalgam is spread out over the surface 14 to form a layer 16 of the amalgam. The base plate is placed at a temperature below the melting temperature of the liquid metal in the amalgam layer 16. For example, if the liquid metal is gallium the temperature would have to be below about 30° C. This can be achieved by placing the base plate 12 in a cooling chamber, or by passing a cooling material through passages in the base plate 12. By having the base plate 12 at a temperature below the melting temperature of the liquid metal in the amalgam 16, the amalgam is cooled below this temperature. This freezes the amalgam into a solid sheet.

An electrode 18 having a fine tip 20 is then placed on the frozen layer 16 of the amalgam. The electrode 18 is heated, either by resistance or induction heating, to a temperature above the melting temperature of the liquid metal in the amalgam. The heat from the electrode 18 is conducted to the portion of the amalgam layer 16 under the tip 20 to form a molten zone 22 in the amalgam layer 16. By moving the electrode 18 over the amalgam layer 16 along the edge of the portion of the amalgam layer 16 which is to form the preform, the molten zone 22 will be formed along the entire edge of the preform. The heated amalgam pulls back and separates the preform from the remaining portion of the amalgam layer 16. The preform can then be removed from the surface 14. The preform should then be placed in a cooling chamber to maintain it in solid frozen form at a temperature below the melting temperature of the liquid metal in the amalgam until the preform is to be used.

Figure 2:
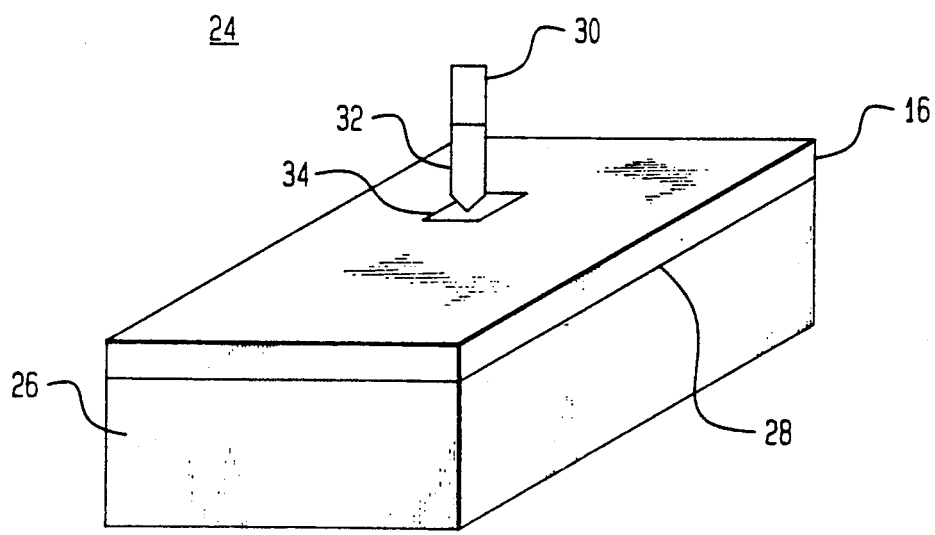
FIG. 2 is a perspective view of a modification of the apparatus for carrying out the method of the present invention.

Referring to FIG. 2, there is shown a perspective view of a modification 24 of the apparatus for carrying out the method of the present invention. The apparatus 24 comprises a base plate 26 of a good heat conductive material having a surface 28. A layer 16 of the amalgam is formed on the surface 28, and the base plate 26 is cooled to form the amalgam into a thin solid layer. A laser 30 is mounted above the amalgam layer 16 and directs a narrow beam 32 onto the amalgam layer 16. The laser beam 32 heats a portion of the amalgam layer 16 to form a narrow molten zone 34. The laser 30 is movable over the amalgam layer 16 along a line which defines the outer edge of a preform. This extends the molten zone 34 along the outer edge of the preform so as to separate the preform from the remaining portion of the amalgam layer 16. The preform can then be removed from the surface 28 and placed in a cold ambient for storage until it is required for use.

Figure 3:
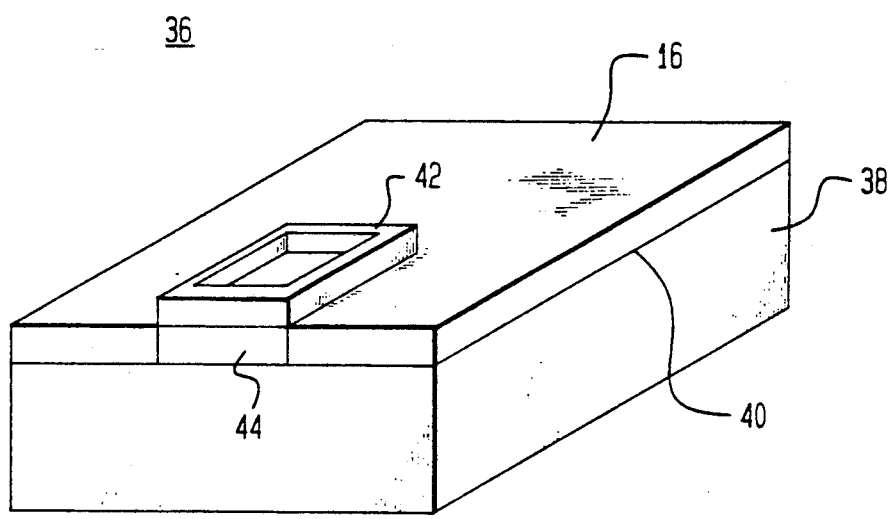
FIG. 3 is a perspective view of still another modification of an apparatus for carrying out a variation of the method of the present invention.

Referring to FIG. 3, there is shown a perspective view of another modification 36 of an apparatus for carrying out the method of the present invention. Apparatus 36 comprises a base plate 38 of a good heat conductive material having a surface 40. A layer 16 of the amalgam is formed on the surface 40. The base plate 38 is maintained at a temperature above the melting temperature of the liquid metal in the amalgam so that the amalgam layer 16 is maintained in liquid form. A die 42 of the desired shape and size for the preform is then placed on the amalgam layer 16. The die 42 is cooled well below the melting temperature of the liquid metal in the amalgam. This causes the zone 44 in the amalgam layer 16 directly under the die 42 to cool to below the melting temperature of the liquid metal and thereby freeze. The amalgam in the zone 44 will solidify onto the die 42 and can be separated from the remaining portion of the amalgam layer 16 by lifting the die 42 away from the base plate 38. The frozen preform can then be peeled from the die 42 and placed in a cold ambient for storage until it is needed for use.

Thus, there is provided by the present invention methods and apparatus for forming solid preform bodies of an amalgam from a layer of amalgam. The bodies are formed easily and quickly without the need for cutting, shearing or the like. Once the solid preform bodies are formed, they can be stored for long periods of time until they are required for use.

It is to be appreciated and understood that the specific embodiments of the invention are merely illustrative of the general principles of the invention. Various modifications may be made consistent with the principles set forth. For example, various means may be used to either cool or heat the amalgam layer to provide the two temperatures. Also, the electrodes or dies can be of various shapes and sizes depending on the shape and size of the preform body being formed.

What is claimed is:

1. A method of forming a body of an amalgam of a desired size and shape, said amalgam comprising the steps of:
   mixing together a liquid metal and a powdered metal to form the amalgam in liquid form;
   forming the liquid amalgam into a thin layer;
   applying a first temperature to the entire layer of amalgam; and
   applying a second temperature to a portion of the amalgam layer which is to form the body;
   one of said temperatures being below the melting temperature of the liquid metal in the amalgam, and the other temperature being above the melting temperature of the liquid metal.

2. The method of claim 1 wherein the liquid amalgam is formed into a thin layer by spreading it out over a surface.

3. The method of claim 2 wherein the first temperature is below the melting temperature of the liquid metal so as to freeze the entire layer of the amalgam into a solid layer, and the second temperature is above the melting temperature of the liquid metal so as to melt a portion of the frozen layer and separate the body from the remaining portion of the amalgam layer.

4. The method of claim 3 wherein the second temperature is applied along the edge of the body to be formed so as to form a molten zone in the amalgam layer along the edge of the body and thereby separate the body from the remaining portion of the amalgam layer.

5. The method of claim 4 wherein the second temperature is applied to the amalgam layer by placing a heated electrode on the amalgam layer.

6. The method of claim 4 wherein the second temperature is applied by directing a laser beam onto the amalgam layer to heat a portion of the amalgam layer and form the molten zone in the amalgam layer.

7. The method of claim 2 wherein the first temperature is above the melting temperature of the liquid metal in the amalgam so as to maintain the amalgam layer in a liquid state, and the second temperature is below the melting temperature of the liquid metal so as to freeze a portion of the amalgam layer and form the body in solid form.

8. The method of claim 7 in which the second temperature is applied along the area which is to form the body to form a zone in the amalgam layer which is frozen to solid form and which can then be removed from the liquid amalgam layer.

9. The method of claim 8 wherein the second temperature is applied by placing a die of the desired shape and size on the liquid amalgam layer and cooling the die to a temperature below the melting temperature of the liquid metal in the amalgam.

10. The method of claim 2 wherein the liquid metal in the amalgam is either mercury or gallium and is present in the mixture in the amount of 55% to 95% by weight.

11. The method of claim 10 in which the powdered metal in the amalgam is selected from the group consisting of nickel, copper, silver, gold, antimony, tin, cobalt, magnesium, manganese, chromium, titanium, molybdenum, aluminum, iron and mixtures thereof.

12. Apparatus for forming a body of a desired shape and size from a thin layer of an amalgam comprising a mixture of a liquid metal and a powdered metal comprising:
   a base plate having a surface on which the amalgam can be spread as a thin layer;
   means for cooling the base plate to a first temperature below the melting temperature of the liquid metal in the amalgam so as to apply the first temperature to and completely through said layer; and
   means for applying a second temperature above the melting temperature of the liquid metal to and completely through said layer along the edge of a portion of the layer which is to form the body.

13. The apparatus of claim 12 in which the means for applying the second temperature to the amalgam comprises an electrode having a fine tip and means for heating the electrode to a temperature above the melting temperature of the liquid metal in the amalgam.

14. The apparatus of claim 12 in which the means for applying the second temperature comprises a laser adapted to direct a beam onto the amalgam layer and thereby heat the amalgam to a temperature above the melting temperature of the liquid metal.

15. Apparatus for forming a body of a desired shape and size from a thin layer of an amalgam comprising a mixture of a liquid metal and a powdered metal comprising:
   a base plate having a surface on which the amalgam can be spread as a thin layer;
   means for heating the base plate to a first temperature above the melting temperature of the liquid metal in the amalgam so as to apply the first temperature completely through the layer; and
   means for applying a second temperature below the melting temperature of the liquid metal in the amalgam to and completely through the layer along the edge of a portion of the layer which is to form the body.

16. The apparatus of claim 15 in which the means for applying the second temperature to the amalgam comprises a die of the shape and size of the body to be formed adapted to be placed on the amalgam layer and means for cooling the die to a temperature below the melting temperature of the liquid metal in the amalgam.

* * * * *